April 16, 1963 R. W. ARMSTRONG ET AL 3,085,595
AIRCRAFT INSTRUMENTS
Filed March 27, 1961 3 Sheets-Sheet 1
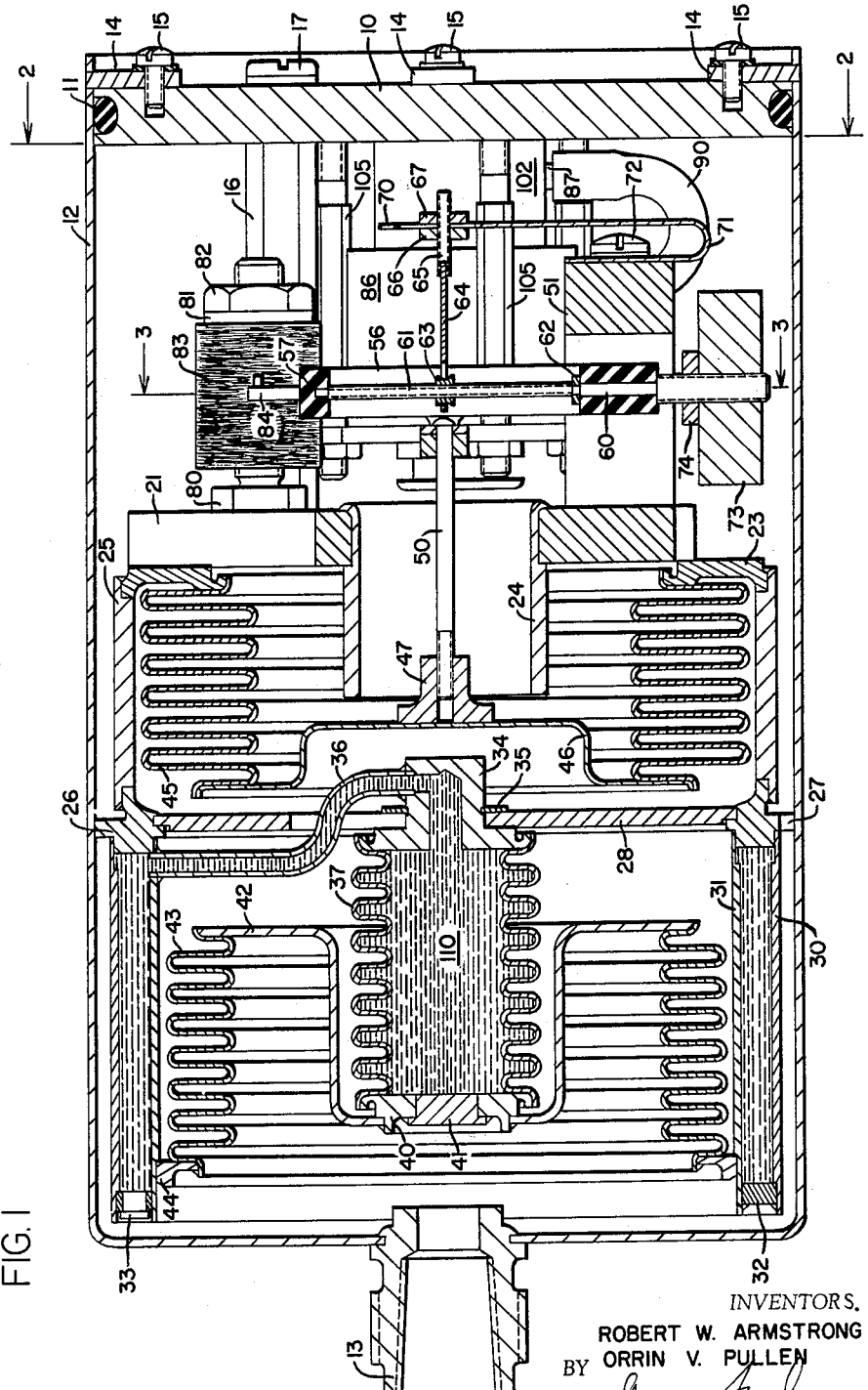
FIG. I
INVENTORS.
ROBERT W. ARMSTRONG
BY ORRIN V. PULLEN
ATTORNEY

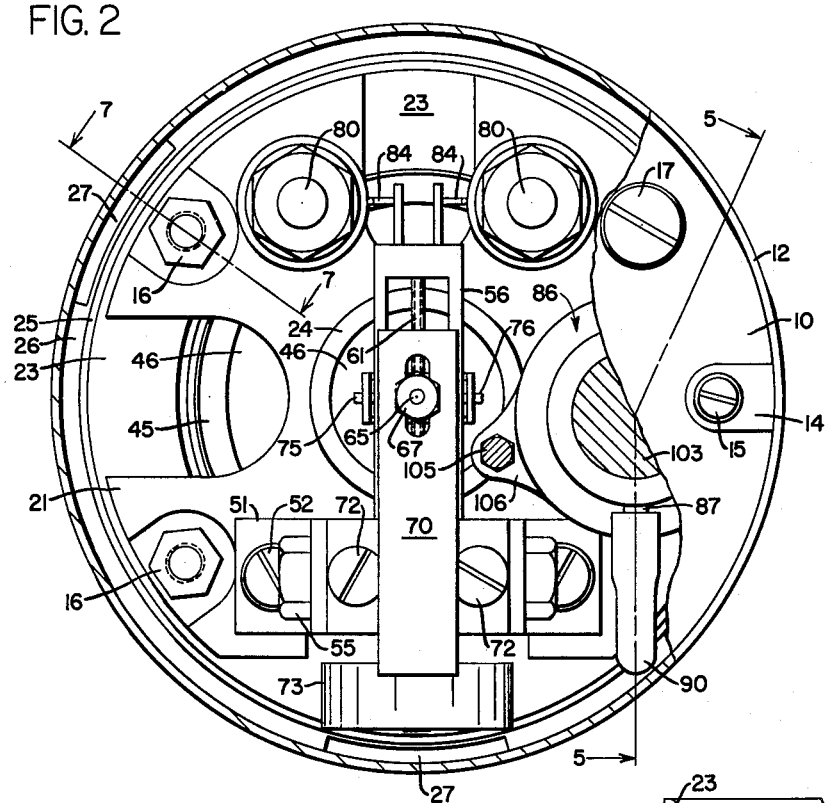
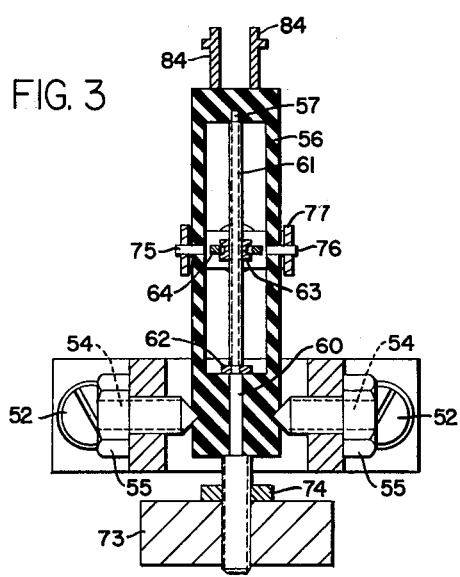
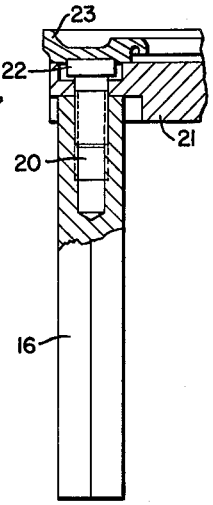

April 16, 1963 R. W. ARMSTRONG ET AL 3,085,595
AIRCRAFT INSTRUMENTS
Filed March 27, 1961 3 Sheets-Sheet 3
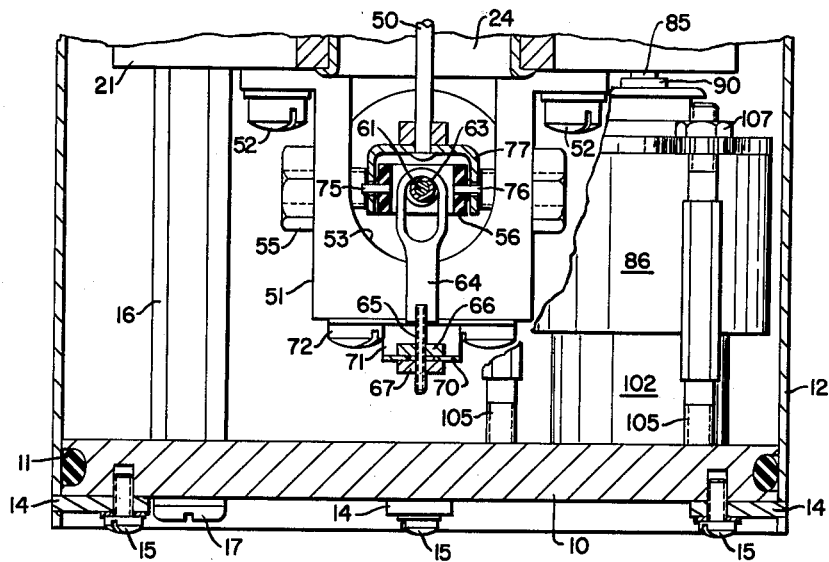
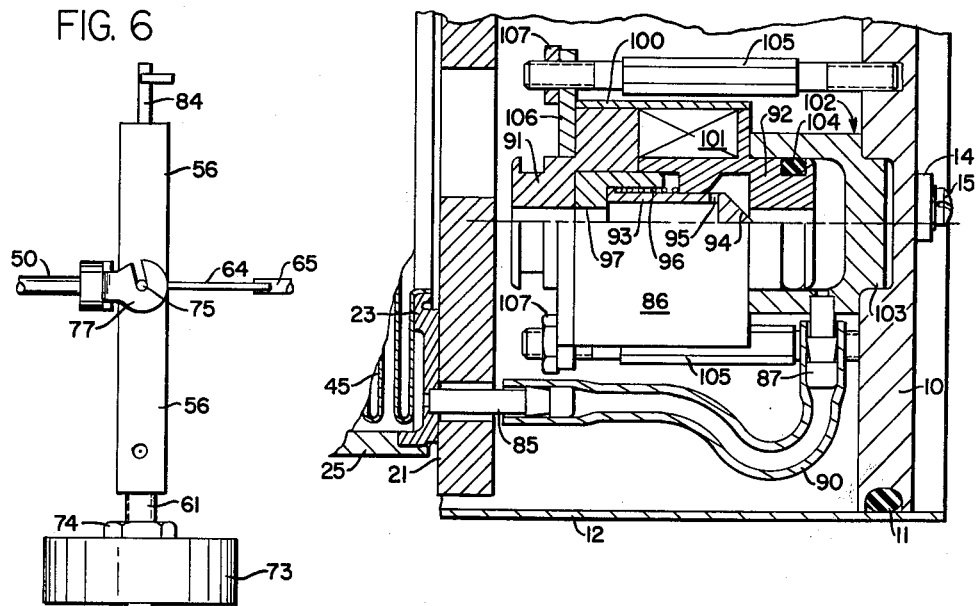
INVENTORS.
ROBERT W. ARMSTRONG
ORRIN V. PULLEN
BY
*George Field*
ATTORNEY

3,085,595
AIRCRAFT INSTRUMENTS
Robert W. Armstrong, Mound, and Orrin V. Pullen, St. Anthony Village, Minn., assignors to Minneapolis-Honeywell Regulator Company, Minneapolis, Minn., a corporation of Delaware
Filed Mar. 27, 1961, Ser. No. 98,614
2 Claims. (Cl. 137—779)

This invention relates to the field of aeronautical instruments and more particularly to improved apparatus for giving an output indicative of the departure of an aircraft from a particular altitude which may be selected at will, the improvement comprising means for rendering the output of the apparatus insensitive to changes in the ambient temperature.

In the field of altitude control it is known to provide an instrument including means responsive to a difference in pressure on opposite sides of a bellows for example. When automatic altitude control is not desired both sides of the bellows are placed in communication with the ambient atmosphere and are hence subject to identical pressures. When altitude control is desired the communication between the ambient atmosphere and one side of the bellows is cut off, which results in trapping a volume of air at the pressure then prevailing: any subsequent change in the altitude of the aircraft results in change in the pressure on the other side of the bellows, which responds mechanically to any pressure difference. The response may be used to control the movement of the aircraft to restore it to the desired altitude, or simply to give an indication of altitude deviation.

Such apparatus is subject to the defect that even if the altitude of the aircraft remains constant, the apparatus gives an output upon change in ambient temperature. The object of the present invention is to provide improved means for rendering the apparatus insensitive to temperature changes.

Various other objects, advantages, and features of novelty, not individually enumerated above, which characterize the invention are pointed out with particularity in the claims annexed hereto and forming a part. However, for a better understanding of the invention, its advantages, and objects attained by its use, reference should be had to the subjoined drawing, which forms a further part hereof, and to the accompanying descriptive matter, in which there is illustrated and described a preferred embodiment of the invention.

In the drawing, FIGURE 1 is a generally central longitudinal section of an instrument embodying the invention, FIGURE 2 is an elevation of the structure of FIGURE 1 as seen from the right, parts being broken away to show a section taken along the line 2—2 of FIGURE 1, FIGURE 3 is a fragmentary section taken along the line 3—3 of FIGURE 1, FIGURE 4 is a plan view of a portion of the device shown in FIGURE 1, certain parts being further shown in section for purposes of illustration, FIGURE 5 shows a fragmentary section taken along the line 5—5 of FIGURE 2, FIGURE 6 shows a detail, and FIGURE 7 is a sectional detail taken along the line 7—7 of FIGURE 2.

The instrument is assembled upon a base 10 having a peripheral groove to receive an O-ring 11 sealing the base to a housing 12 which is perforated to receive mounting fingers 14 holding it to the base by means such as screws 15, thereby defining a chamber which communicates with the ambient atmosphere through a connection 13 for receiving conventional pneumatic tubing.

A plurality of pillars 16 are fastened at first ends to base 10 by means such as screws 17: at their other ends the pillars are tapped to receive fastening means in the form of cap screws 20 which traverse apertures in a mounting plate 21 and have heads 22 which are silver-soldered to a metallic end ring 23, as best shown in FIGURE 7. Mounting plate 21 may have portions cut away as desired, for weight reduction: it has a central bore within which is secured a stop tube 24.

Soldered to ring 23 is a spacing tube 25 which in turn is soldered to a separating ring 26, sized to engage housing 12 internally except at a plurality of peripheral apertures such as are shown at 27. Sealed to ring 26 are a pair of concentric cylindrical shells, the outer shell 30 being spaced from the inner shell 31 to provide an annular liquid chamber in combination with ring 26 and a closure ring 32, the latter being provided with a filling aperture which is closed by a plug 33.

Separating ring 26 carries a centering plate 28 having a central aperture shaped to receive a hub 34, to which it is fastened by a snap ring 35, and to pass a tube 36 which communicates with and is secured to an opening in inner shell 31 and a bore in hub 34. A first bellows 37 is brazed to hub 34 at one end: at the other end it is brazed to a header 40 bored to receive a sealing plug 41. Carried on header 40 is a deep bell 42: one end of a second bellows 43 is brazed to bell 42, and the other end is brazed to a sealing ring 44 brazed to inner shell 31.

A third bellow 45 is brazed to end ring 23 at one end, and is brazed at the other end to a shallow bell 46. A socket 47 is brazed centrally to bell 46, and is tapped to threadedly receive a rod 50.

A bracket 51 is mounted on plate 21 by suitable means 52, and is hollowed out as at 53. Bracket 51 is bored and tapped to receive a pair of pivot screws 54 having lock nuts 55. A hollow frame 56 of electrically insulating material is pivotally mounted on screws 54, and has an upper bearing 57 and a lower bearing 60 for a threaded shaft 61, held in frame 56 by a snap ring 62. An internally threaded member 63 having a groove on its surface is threaded on shaft 61 and is engaged by a pull strap 64 having an end stud 65 threaded to receive nuts 66 and 67.

A leaf spring 70 with a reverse bend 71 is clamped between nuts 66 and 67; its other end is fastened to bracket 51 by suitable means 72. The lower end of shaft 61 is shouldered and threaded to receive a counterweight 73 held by a lock nut 74.

Frame 56 carries a pair of aligned pintles 75 and 76 which pass through slots in a yoke 77 pivotally carried on the end of rod 50. By reason of the friction resulting from the pull of strap 64, member 63 is restrained against rotating when shaft 61 is turned by counterweight 73 as a knob, and the lever arm of spring 70 acting about pivot screws 54 may thus be adjusted to be equal to, less than, or greater than that of rod 50. Variations in the spring rates of the bellows and spring resulting from production manufacture may thus be corrected for.

A pair of studs 80 are carried by plate 21, and mounted upon each stud, as by a washer 81 and a nut 82, is a bobbin 83 having a resistive winding on its surface. Carried by frame 56 for cooperation with the resistance winding, are a pair of wipers 84. Electrical connection to the wipers and the ends of the windings may be made through any suitable electrical connector, not shown, which passes through base 10 in hermetically sealed relation thereto.

As best shown in FIGURE 5, mounting plate 21 is bored to receive a nipple 85 through which communication may be established between the interior of housing 12 and the otherwise completely closed irregular trapped air chamber shown in FIGURE 1 and defined by the inside of bell 46, the outside of bellows 45, the inner surfaces of ring 23, tube 25, ring 26, shell 31, and ring 44, the outside of bellows 43, the inside of bell 42, and the outsides of header 40, bellows 37, hub 34, and tube 36. This communication can be cut off by a solenoid valve generally indicated at 86, having a nipple 87 connected to nipple 85 by suitable tubing 90.

Valve 86 may be of any suitable construction: one embodiment is shown schematically in FIGURE 5 to comprise cooperating bored body members 91 and 92, the bore of the latter forming a valve seat which cooperates with a hollow plunger 93 of magnetic material having a conical end closure 94 and a radial bore 95. A spring 96 cooperates with an internal shoulder in member 92 and an external shoulder on plunger 93 to normally urge the latter into a position abutting a guide member 97, in which position a channel is open through members 91 and 97, plunger 93, aperture 95, and out past the seat in member 92. Members 91 and 92 are held in assembled relation by a shell 100, and these three elements define a space for the operating solenoid 101 of the valve. When the solenoid is energized, plunger 93 is actuated to the right, so that the conical end closure 94 engages the seat in member 92, and no channel remains open through the valve.

Valve 86 is mounted in an adapter 102, having a boss 103 arranged to be received in a recess in base 10, and bored to receive nipple 87 and place it in communication with the opening in member 92: an O-ring 104 prevents leakage between member 92 and adapter 102. Base 10 also is tapped to threadedly receive a plurality of mounting posts 105, and a mounting plate 106 is bored to receive member 91 and the ends of posts 105, the whole being held in assembled relation by means such as nuts 107. Connection is made to the solenoid through the electrical connector referred to above.

Before use the liquid chamber is filled with a substantially noncorrosive, incompressible liquid 110, having a positive temperature coefficient of expansion, from which dissolved gases have been expelled. The trapped air chamber is thus partially shielded from changes in ambient temperature by the thermal reservoir which the liquid furnishes.

*Operation*

In operation the apparatus is connected, through connector 13 and suitable tubing, to the ambient atmosphere. Valve 86 is initially de-energized and therefore open, and provides a channel for pressure equalization between the housing and the trapped air chamber. As the ambient pressure changes with changes in altitude of an aircraft carrying the apparatus, the pressure in the trapped air chamber changes with it. Elements 83 and 84 may be connected to an electrical automatic pilot to supply a signal in the vertical control channel thereof which varies as member 84 is displaced from a normal position: the normal position is that prevailing when the pressures in the housing and the trapped air chamber are equal, so that initially no electrical signal is supplied by the apparatus as the aircraft moves vertically. It will be understood that for more simple systems the electrical output of the apparatus may be connected to a conventional electrical indicator arranged for observation by the human pilot of the aircraft.

When it is desired to fly at a selected altitude, solenoid valve 86 is energized, to close the channel through tubing 90, when the aircraft achieves the selected altitude. If the aircraft altitude remains the same thereafter, no operation of member 84 takes place, but if the aircraft departs from the selected altitude the pressure in the housing becomes unequal to that in the trapped air chamber. Bell 46 moves to the left if the aircraft altitude decreases, and to the right if the altitude increases, and member 84 moves with respect to member 83, supplying an appropriate signal to the automatic pilot or the indicator of the aircraft.

If the temperature changes, the pressure of the gas in a chamber varies proportionally. This means that a signal would be supplied by the apparatus giving, a false indication of change in altitude, in the event of a temperature change while the aircraft was actually at the desired altitude. The present invention compensates for this temperature change as follows.

Since liquid 110 is incompressible, bellows 37 acts substantially as a rigid connection between hub 34 and header 40, thus substantially fixing the volume of the chamber enclosed within bellows 43 at any fixed temperature, regardless of changes in pressure. Upon an increase in temperature, however, the liquid expands, forcing header 40 away from hub 34 and thus increasing the volume of the chamber enclosed between bellows 43 and shell 31. By properly proportioning the several bellows with respect to the temperature coefficient of the liquid 110, it is possible to make the increase in volume just sufficient to maintain the pressure in the trapped air chamber constant with increasing temperature.

If the temperature drops, the fluid contracts, reducing the volume of the trapped air chamber and again maintaining the pressure constant.

The arrangement shown, with the liquid both outside and inside the trapped air chamber, is such as to give a speed of temperature response adequate to keep up with the rates of change of ambient temperature normally encountered. For unexpected or abrupt temperature changes a desirable integration effect results.

Numerous objects and advantages of the invention have been set forth in the foregoing description, together with details of the structure and function of the invention, and the novel features thereof are pointed out in the appended claims. The disclosure, however, is illustrative only, and changes in detail may be made, especially in matters of shape, size, and arrangement of parts, within the principles of the invention, to the full extent indicated by the broad general meaning of the terms in which the appended claims are expressed.

We claim as our invention:

1. In combination: a chamber having rigid side walls, a rigid central member, and end walls resiliently connected to said side walls for movement toward and away from said member in accordance with any difference between the fluid pressures external and internal to said chamber; control means actuated in accordance with the movement of one of said end walls relative to said member; and further means connected between said member and the other end wall to vary the distance therebetween and hence the volume of the chamber.

2. In combination: a chamber having rigid side walls, a central rigid member, and end walls resiliently connected to said side walls for movement toward and away from said member in accordance with any difference between the fluid pressures external and internal to said chamber; control means actuated in accordance with movement of one of said end walls relative to said fixed member; and temperature responsive means connected between said member and the other end wall to vary the distance therebetween and hence the volume of the chamber.

References Cited in the file of this patent
UNITED STATES PATENTS

| | | |
|---|---|---|
| 1,405,841 | Haines | Feb. 7, 1922 |
| 2,646,682 | Ovtschinnikoff | July 28, 1953 |